Oct. 10, 1950 — A. B. SIMMONS — 2,525,564
SLIDE-CHANGING DEVICE
Filed Sept. 24, 1947 — 2 Sheets-Sheet 1
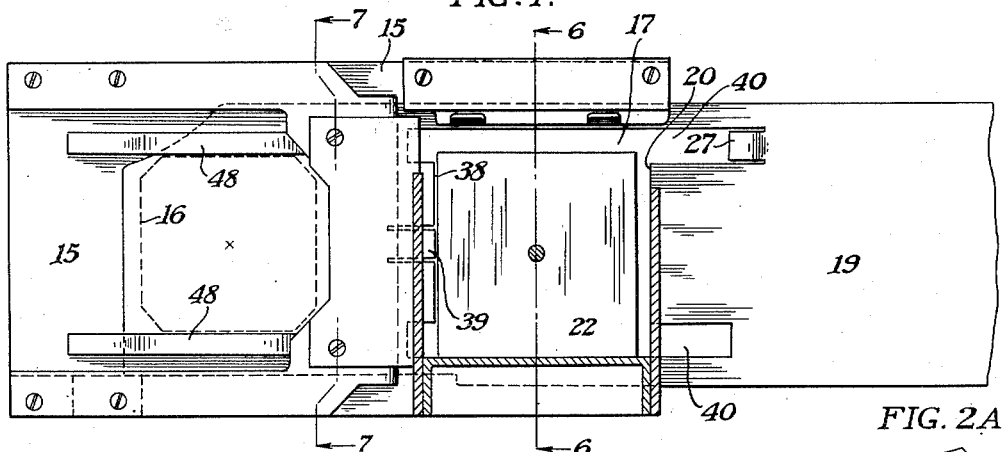
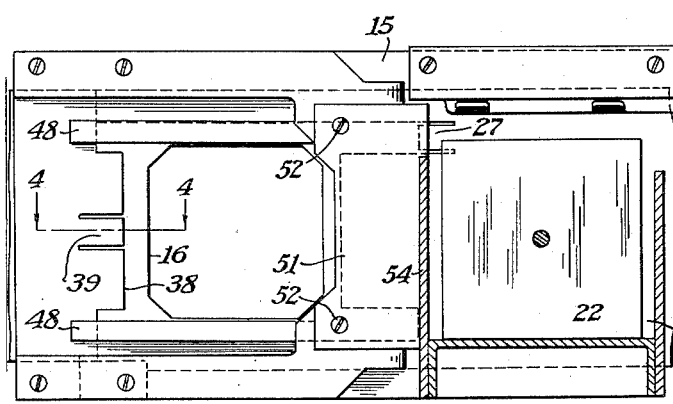
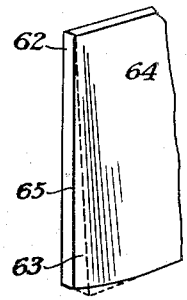
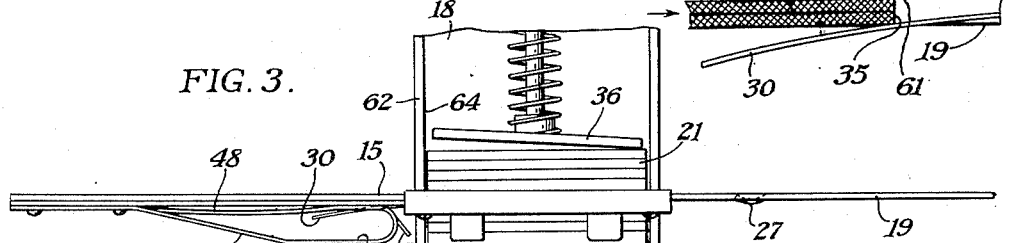
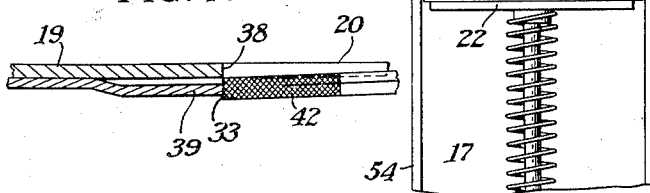
ARTHUR B. SIMMONS
INVENTOR Oct. 10, 1950   A. B. SIMMONS   2,525,564
SLIDE-CHANGING DEVICE
Filed Sept. 24, 1947   2 Sheets-Sheet 2
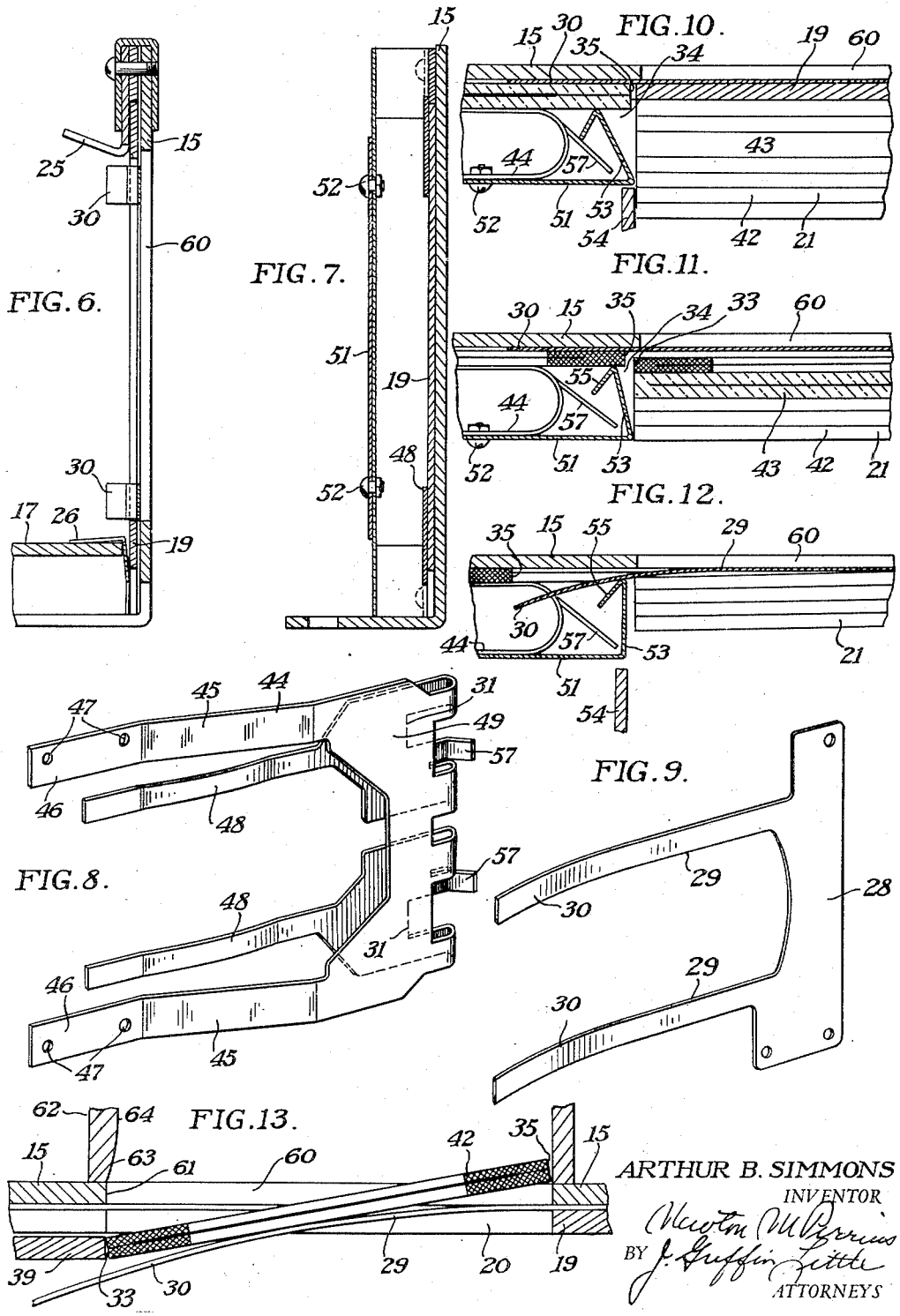
ARTHUR B. SIMMONS
INVENTOR
BY
ATTORNEYS Patented Oct. 10, 1950

2,525,564

UNITED STATES PATENT OFFICE 2,525,564

SLIDE-CHANGING DEVICE

Arthur B. Simmons, Rochester, N. Y., assignor to Eastman Kodak Company, Rochester, N. Y., a corporation of New Jersey Application September 24, 1947, Serial No. 775,837

12 Claims. (Cl. 88—28)

1

The present invention relates to slide projectors, and more particularly to a slide changing device by which transparencies or slides are to be moved into and out of projecting position.

One object of the invention is the provision in such a device of a mechanism which effectively prevents the feeding or ejecting of more than one slide at a time out of the supply magazine.

Still another object of the invention is the provision of a slide separating spring which will allow the feeding of slides of different thicknesses out of the supply magazine, but which effectively limits the feeding to one slide at a time.

Yet another object of the invention is the provision of guide fingers in the supply magazine for guiding slides from the magazine to a position to be engaged and moved by the reciprocating slide changer.

And another object of the invention is the provision of a die cast take-up magazine, a portion of a tapered wall of which adjacent to the ejecting aperture is recessed so as to bring the wall adjacent the aperture into vertical alignment therewith to permit the entire trailing edge of a slide to be ejected simultaneously from the aperture and into the take-up magazine.

To these and other ends, the invention resides in certain improvements and combinations of parts, all as will be hereinafter more fully described, the novel features being pointed out in the claims at the end of the specification.

In the drawings:

Fig. 1 is an elevation view looking from the rear of the supply magazine, showing the arrangement of the latter and the slide changer with its apertured-supporting plate, and with the slide changer in its retractive position;

Fig. 2 is a view similar to Fig. 1, with the slide changer moved to a position in which the slide has been ejected from the supply magazine and moved into projecting position;

Fig. 2a is a view of a portion of the side wall of the take-up magazine, showing the cut-away, or recessed, portion.

Fig. 3 is a plan view of the slide changing mechanism, showing the arrangement of the various parts;

Fig. 4 is a horizontal sectional view through a portion of the slide changer, and taken substantially on line 4—4 of Fig. 2, but on a larger scale than the latter, showing the off-set lug on the slide changer engaging the trailing edge of the slide as the latter reaches the end of its movement;

Fig. 5 is a horizontal sectional view taken

2 through a portion of the take-up magazine adjacent the slide changer, showing the recessed portion of the side wall of the magazine for bringing the inner face of the wall at the ejection aperture into vertical alignment with the edge of the latter so that the entire trailing edge of the slide may be simultaneously ejected into the take-up magazine;

Fig. 6 is a vertical sectional view taken substantially on line 6—6 of Fig. 1, showing the entrance fingers for guiding the slides from the supply magazine to the slide changer;

Fig. 7 is a vertical sectional view taken substantially on line 7—7 of Fig. 1, showing the arrangement of the slide separating spring and the slide pressure spring to the mounting plate;

Fig. 8 is a perspective view of the combined slide pressure spring and the pressure pad for retaining the slide in position at the projection aperture;

Fig. 9 is a perspective view of the slide crossover spring for directing slides from the projection aperture to the take-up magazine;

Figs. 10-12 show the relation of the slide-separating spring and the slide pressure spring to the supply magazine, and the operation of these springs during the feeding of slides of different thicknesses from the supply magazine; and Fig. 13 is a horizontal sectional view through a portion of the device, showing the arrangement of ejecting the slides into the supply magazine.

Similar reference numerals throughout the various views indicate the same parts.

The present invention relates to a slide changing mechanism adapted for use in connection with a projection apparatus for moving slides or transparencies into and out of projecting position. The mechanism comprises a mounting plate 15 adapted to be connected or attached in any suitable manner to a projector, not shown, so that the projection aperture 16 of the plate is in alignment with the optical element of the projector, as will be readily understood by those familiar with such mechanisms. A supply magazine 17 and a take-up magazine 18 are mounted on opposite sides of the plate 15 and, in the present embodiment, are arranged in alignment, as best shown in Fig. 3. A slide changer in the form of a thin metal plate 19, formed with a slide receiving opening 20, is reciprocally mounted in a slot or guideway on the mounting plate 15, and is adapted to be moved from the position shown in Fig. 1 to move a slide, generally indicated by numeral 21, from the supply magazine 17 into position in registry with the projection aperture 16. On the return movement of the plate 19, the slide is removed from projecting position and is delivered to the take-up magazine 18. A spring press follower 22 serves to move the slides 21 in the supply magazine 17 forwardly thereof and into position to be received in the opening 20 of the slide changer 19.

Thus, upon each forward movement of the slide changer 19, a slide is removed or ejected from the supply magazine, and is fed into projecting position in registry with the projecting aperture 16. The return movement of the slide changer serves to remove the slide from projecting position and to deliver the slide to the take-up magazine 18, in a manner to be later more fully described.

As the slides 21 are moved forwardly in the supply magazine 17 by the follower 22, certain of the slides may tend to move upwardly and out of vertical alignment with the receiving opening 20 of the slide changer 19. It is apparent that if the slides do not register with the opening 20, they will not move thereinto and will not be fed by the forward movement of the slide changer, the disadvantages of which are apparent to those familiar with the art.

In order to insure such registration, a pair of upper fingers 25 are provided, as best shown in Fig. 6. These upper fingers extend inwardly from the plate 15 and are inclined downwardly and forwardly toward plate 15 so as to engage the top edge of the slides as they approach the slide changer. These fingers guide the slide downwardly and into position to be moved by the slide changer. The supply magazine is also provided with a pair of upwardly and forwardly extending lower entrance fingers 26 adapted to engage the lower edges of the slides and to cooperate with the upper fingers 25 to guide the slides positively and accurately into position in the receiving opening 20 of the slide changer 19. These upper and lower guides or entrance fingers are so positioned that the slides in the supply magazine may enter the opening 20 without striking any shoulder, but be guided into position by the inclined relation of the fingers, as will be readily apparent from an inspection of Fig. 6.

It has been found that when the slide changer plate 19 is moved to eject the first slide from the supply magazine, the first slide may tend to catch or jam, for various reasons, on the next or second slide so as to prevent or interfere with the smooth movement of the first slide out of the magazine. In order to overcome such catching or jamming, the slide changer plate 19 is provided with a means in the form of a cam 27 struck up from the metal of the plate 19 and bent out of the plane thereof and towards the supply magazine. Now when the plate 19 is moved inwardly to eject the first slide, the cam 27 will engage the front face of the second slide to impart a tilting or rocking action thereto, as well as to the other slides in the magazine, to cause a separation between the second and first slides to free the first slide so that it may be easily and readily moved or ejected into projecting position by the slide changer plate 19. The cam 27 thus effectively separates the first slide to prevent the jamming thereof on the second or other slides in the supply magazine.

During the inward stroke of the slide changer plate 19, the slide 21 is moved out of the supply magazine 17 and into position in registry with the projection aperture 16 in the plate 15 so that the image of the slide may be projected, in a manner well known to those in the art. However, on the return or outward movement of the plate 19, the slide 21 is moved out of registry with the aperture 16 and is fed or delivered into the take-up magazine 18. In order that the single plate 19 may move the slide both out of the supply magazine and into the take-up magazine, arranged in the manner shown in the drawings, a slide cross-over spring is provided. This cross-over spring is best shown in Fig. 9 and comprises a base portion 28 which is secured to the front side of the plate 15 just to the right of the magazines, and has projecting therefrom a pair of spaced slightly bowed fingers 29 which extend across the space between the two magazines. The ends 30 of the fingers 29 are bent, as shown best in Fig. 12, and extend into the recesses or slots 31 formed in a slide pressure spring shown in Fig. 8 and to be later more fully described. The plate 19 is provided with elongated slots 40 to accommodate the fingers 29. The arrangement of the cross-over spring with relation to the slides is best shown in Figs. 5 and 11 to 13.

The supply magazine is formed with an exit or opening 34 through which the slides are moved out of the supply magazine by the plate 19. The ends 30 of the fingers 29 lie across the exit and in the path of the slides, as best shown in Fig. 12. As a slide is moved out of the supply magazine, the leading edge 33 of the slide engages the ends 30 of the fingers 29 and bends or flexes the latter backwards or upwards, as viewed in Fig. 12, to the position shown in Figs. 10 and 11, to permit the passage of the slide to the projection aperture. However, when the trailing edge 35 of the slide being moved passes the ends 30, the latter spring back behind the slide to the position shown in Fig. 12. Now when the changer plate 19 is returned, the edge 35, which now becomes the leading edge of the returning slide, engages the ends 30 of the fingers 29, and the latter guide or deflect the slide to the take-up magazine, as shown in Figs. 5 and 13. The ends 30 of the cross-over spring thus act as cams to move the slides to the opposite side of the cross-over spring and into the take-up magazine.

To facilitate entrance of the slide to the take-up magazine, the spring press follower 36 positioned therein is arranged at an angle, as shown in Fig. 3 so that the slides already in the take-up magazine are loosely held near the point at which the new slide enters so that the new slide easily moves between the plate 15 and the group of slides already in the take-up magazine. To further facilitate such discharge into the take-up magazine, the fingers 29 are slightly bowed, as shown in Fig. 5, towards the follower 36 to provide a slight space into which the new slides may move.

On the outward movement of the plate 19, the slide is moved by reason of the engagement of the leftward edge 38 of the opening 20 with the edge 33 of the slide. However, when the edge 35 of the slide finally engages the bowed portions of the fingers 29, as shown in Figs. 5 and 13, the slide will tend to pivot about a vertical axis and may move out of the plane of the opening 20, due to the thinness of the plate 19. In such a position, the edge 33 may be moved out of contact by the edge 38, as shown in Fig. 4, so that the latter would no longer be effected to move the slide into the take-up magazine. In order to insure positive movement of the slide, the plate 19, adjacent edge 38, is provided with a formed-up lug 39 bent out of the plane of the plate, as best shown in Fig. 4. Now as the slide pivots, as shown in Fig. 13, to shift the edge 33 out of contact with the edge 38, the lug 39 will then become effective to engage edge 33, as shown in Figs. 4 and 13, to complete the movement of the slide into the take-up magazine.

As is well known, transparencies for use in projectors may be mounted in well-known paper frames and are designated as "thin" slides. Such a slide being illustrated at 42, Figs. 3 and 11. On the other hand, the transparency may be mounted in metal or similar frames which are of greater thickness than the paper mount and are designated as "thick" slides, such as shown at 43, Figs. 3, 10 and 11. Thus, the supply magazine may have slides of varying thickness. However, each time the slide changer plate 19 is moved inwardly, it is desirable to eject one and only one slide from the supply magazine, for reasons which will be readily apparent to those familiar with such projectors. To this end, the present invention provides an arrangement by which slides of different thicknesses, such as thin and thick slides, may be effectively shifted by the plate 19, yet which positively prevent the ejecting or moving of more than one slide at a time from the supply magazine on each actuation of the slide changer plate.

To secure this result, the present invention provides a slide pressure spring, broadly designated by the numeral 44, formed from any suitable sheet spring material, such as spring metal, to provide a base portion 49 spaced from the plate 15, as best shown in Fig. 3. A pair of flexible finger-like members 45 extend from the base 49 toward the plate 15 and terminate in flat end-connecting portions 46 which lie against the plate 15 on opposite sides of the projection aperture 16, and are formed with aperture 47 adapted to receive screws or other suitable fastening means to connect the portions 46 to the plate 15. Thus, the slide pressure spring is connected at one end only to the plate 15 by reason of the portions 46 and is thus of the cantilever type. The free end of the base 49 has a portion bent upon itself and formed to provide a pair of spaced flexible arms 48 which are spaced a distance less than the fingers 45 and are adapted to engage the slide when in position before the projection aperture 16 to hold the slide in position during projection. The arms 48 thus provide a pressure pad for accurately and positively retaining the slides in proper position during the projecting operation. The base 49 is formed with the previously mentioned slot 31 adapted to receive the ends 30 of the fingers 29 of the cross-over spring.

One leg 51 of a resilient metal L-shaped slide-separating spring is secured to base 49 of the slide-pressure spring 44 by screws 52 or other suitable fastening means. The other leg 53 of the separating spring is in alignment with and forms, in effect, a continuation of the side wall 54 of the supply magazine 17, as best shown in Figs. 10–12. The leg 53 extends across the exit or discharge opening 34 and in the path of the slides being moved or ejected from the supply magazine by the slide changer plate 19, as is apparent from an inspection of Figs. 10 to 12. The free end of the leg 53 is bent over to form a lug or lip 55, the purpose of which will be presently pointed out.

Fig. 12 shows the relation of the slide-pressure spring and the slide-separating spring to the slides in the supply magazine prior to the actuation of the slide changer plate 19. Now assuming that the first slide in the supply magazine is a "thin slide" 42, when the slide changer plate 19 is pushed inwardly it will engage this "thin" slide to move the latter through the exit 34. Such movement will bring the leading edge 33 of the thin slide into engagement with the free end of the leg 53 to cause the latter to flex or bend slightly, as shown in Fig. 11. As the slide continues to be moved, the flexing continues and the angle at which the end of leg 53 contacts the advancing slide is gradually decreased until an appropriate balance of spring force and friction is reached. At that time, the end of leg 53 snaps away from the leading edge of the entering slide; and, with a wiping action, as shown in Fig. 11, slides along the rear face of the slide being moved and finally engages the leading edge 33 of the second slide in the supply magazine to hold the latter against simultaneous movement with the first slide. Thus only a single thin slide will be moved upon each actuation of the plate 19.

On the other hand, when thicker slides, such as slide 43, are moved by the plate 19, such thicker slides will also engage the free end of the leg 53 and will cause an increased flexing thereof, as shown in Fig. 10. This flexing continues during the movement of the slide until the end finally snaps back and wipes along the slide and engages the next succeeding slide in the magazine to prevent the simultaneous movement of the latter. If, however, the slide is of sufficient thickness, the flexing may continue to a point at which the lug 55 is moved far enough to finally engage ears 57 formed up from the base 49 of the slide-pressure spring 44, as shown in Fig. 10. Further movement of such a thicker slide finally will cause the lug 55 to engage ears 57 with sufficient force to move the slide-pressure spring and the slide-separating spring, as a unit, about the secured ends 46 to provide sufficient clearance for such thicker slides. However, even in such an event, the free end of leg 53 finally snaps back and will wipe along the slide and into contact with the next slide to prevent movement of the latter. Thus when thin slides are moved only the leg 53 is flexed; but when thick slides are moved, the leg 53 may be flexed a greater amount until finally the entire unit is moved about the ends 46. In either event, however, only a single slide will be ejected from the supply magazine for each actuation of the slide-changer plate. The slide-separating spring thus provides the necessary wiping action to admit only one slide at a time, and accommodates both thick and thin slides within appropriate limits.

The supply and take-up magazines may be formed of any suitable material. In the preferred arrangement, however, they are formed of die-cast metal. As is well known, die-cast members must be given a certain amount of taper or draft to permit the ready removal from the mold. The result is that the inner surfaces of the side walls of the two magazines will be slightly inclined as indicated in Fig. 2ᵃ, so that the walls will be spaced a slightly greater distance apart at the top than at the bottom. The plate 15, however, is provided with a discharge opening 60 in alignment with the take-up magazine and through which the slides may be discharged from the plate into the take-up magazine. The sides 61 of this discharge aperture are preferably vertical and parallel so as to allow the edges of the slide to be ejected simultaneously along the entire vertical edge. It is apparent, however, that due to the taper of the side walls of the take-up magazine, the inner surfaces thereof will not be vertical, as indicated in Fig. 2ᵃ, and hence will not be in alignment with the sides 61 of the opening 60. The result is that the slides cannot be ejected along the entire edge, but only at the point where the sides 61 and the inner surface of the side walls are in alignment. At other points, the inclined side walls will prevent the release of the slides. For example, if the top edges of the inner surfaces of the side walls are in registry with the tops of the edges 61, the bottoms of the side walls will extend inwardly and overlie the edge so that only the top of the slide will be released. The result will be that the lower portions of the side edge will be held by the portions of the tapered wall which project inwardly from the sides 61. Such an arrangement would not allow the free discharge of the slide from the plate 19 to the take-up magazine, and might cause a jamming of the slides.

In order to overcome this difficulty, the right side of the left wall 62 of the take-up magazine 18, Fig. 3, has a portion 63 of its inner surface 64 adjacent the plate 15 cut away or recessed, as best shown in Figs. 2ᵃ, 5, and 13. This recess serves to bring the inner surface 64 of the left wall 62 at edge 65 adjacent plate 15 in vertical alignment and registry with the adjacent side 61 of the discharge aperture 60. By means of such an arrangement the entire edge of the slide may be ejected simultaneously by reason of the bowed portions of the cross-over spring, as best shown in Figs. 5 and 13, and previously pointed out. As the slides are ejected they move along the recessed portion until they finally reach the main portion of the take-up magazine. Such recessing of the side walls 62 also overcomes the requirement of having overtravel for the slide-changer plate 19 to eject the slides in the take-up magazine.

The present invention thus provides an arrangement by which slides of different thicknesses may be moved by the slide changer, but which effectively prevents the moving of more than one slide at a time. Also the slides in the supply magazine are accurately guided into position to be engaged and moved by the slide-changer plate. Furthermore, the design of the take-up magazine is such as to allow the free discharge of the slide simultaneously along the entire side edge.

In the preferred form, the magazines are die-cast. Such die-casting is, however, a molding operation, and thus requires that taper or draft be given to the parts to permit the ready removal from the mold. In some cases, it may be desirable to mold the magazine from materials other than metal such, for example, as suitable plastics. However, even with plastic molding, taper or draft must be provided, and the same problem of slanting walls will be present, and the wall would have to be recessed, as shown in Fig. 2ᵃ. Therefore, as the same problem is present in all forms of molding the term "die-cast" is used both in the specification and claims in a generic sense to cover all forms of molding of metals, plastic and similar materials.

While certain embodiments of the invention have been disclosed, it is to be understood that the inventive idea may be carried out in a number of ways. This application is, therefore, not to be limited to the precise details disclosed, but is intended to cover all variations and modifications thereof falling within the scope of the appended claims.

I claim:

1. A slide-changing apparatus, comprising, in combination, an apertured plate, a supply magazine secured to said plate and adapted to receive a group of slides of different thicknesses to be projected, a slide changer reciprocally mounted on said plate at the front end of said magazine for moving said slides out of said magazine and into projecting position, and a yieldable slide-separating spring carried by said plate and positioned adjacent the front end of said magazine and actuated and flexed by a slide being moved for preventing the removal of more than one slide at one time from said magazine upon each reciprocation of said changer.

2. A slide-changing apparatus, comprising, in combination, an apertured plate, a supply magazine secured to said plate and adapted to receive a group of slides to be projected, said magazine being formed with a slide discharge opening, a slide changer reciprocally mounted on said plate at the front end of said magazine for moving said slides out of said magazine and through said opening into projecting position, and a leaf spring carried by said plate and having a portion arranged in substantial alignment with a side of said supply magazine and partially blocking said opening so as to be engaged and flexed by a slide being moved out of said magazine and through said opening to permit the passage of only a single slide at a time from said magazine.

3. A slide-changing apparatus, comprising, in combination, an apertured plate, a supply magazine secured to said plate and adapted to receive a group of slides to be projected, a slide changer reciprocally mounted on said plate at the front end of said magazine for moving said slides out of said magazine and into projecting position, and a leaf spring carried by said plate and positioned adjacent the front end of said magazine and having a portion adapted to be engaged and gradually and increasingly flexed by said slides as the latter are moved out of said magazine by said changer and at a predetermined position of a slide being moved the tension of the spring finally overcomes the moving force imparted by the moving slide to cause the spring to snap out of contact with the moving slide to engage the next slide in the magazine to prevent more than one slide at a time being moved by said changer.

4. A slide-changing apparatus, comprising, in combination, an apertured plate, a supply magazine secured to said plate and adapted to receive a group of slides to be projected, a slide changer reciprocally mounted on said plate at the front end of said magazine for moving said slides out of said magazine and into projecting position, and a flexible member carried by said plate and formed with a portion positioned in the path of and arranged normal to the slides being moved out of said magazine by said changer, said portion slidably engaging said slides to be flexed thereby and finally snapping away from the moving slide to engage the next slide in the magazine to permit the passage of slides of different thickness but limiting the passage to only a single slide at each operation of the changer.

5. A slide-changing apparatus, comprising, in combination, an apertured plate, a supply magazine secured to said plate and adapted to receive a group of slides to be projected, a slide changer reciprocally mounted on said plate at the front end of said magazine for moving said slides out of said magazine and into projecting position, said magazine being adapted to receive slides of different thickness and having an exit opening through which the slides are moved out of the magazine by said changer, and a flexible member extending into said opening and into the path of the slides so as to be engaged and flexed by the slides as the latter move out of said magazine, said flexing varying with the thickness of the slides, but at a point in the movement of the slide the member is flexed sufficiently to cause it to snap away from the slide being moved and engages the next slide in the magazine to hold back the latter to limit the passage of only a single slide through said exit upon each actuation of said changer.

6. A slide-changing apparatus, comprising, in combination, an apertured plate, a supply magazine secured to said plate and adapted to receive a group of slides to be projected, a slide changer reciprocally mounted on said plate at the front end of said magazine for moving said slides out of said magazine and into projecting position, said magazine being adapted to receive slides of different thickness and having an exit opening through which the slides may be moved out of the magazine by said changer, a flexible spring member extending across and partially blocking said exit so that as the slides are moved out of said magazine they will engage and flex said member, and a yieldable support for said member carried by said plate, the movement of a thin slide through said exit serving merely to flex said member but the movement of a thick slide therethrough will both flex said member and move said member and support as a unit relative to said plate, the movement of a slide through said exit flexes said member until the latter finally snaps away from the slide being moved and then wipes along the surface of the latter and into engagement with the next slide in the magazine to prevent the feeding of more than one slide at a time through said exit.

7. A slide-changing apparatus, comprising, in combination, a plate formed with a projection aperture in which a slide is positioned during projection, a supply magazine connected to said plate adjacent an end thereof and adapted to receive a plurality of slides which may vary in thickness, a slide changer slidably mounted on said plate and movable across the front end of said magazine to move a slide out of said magazine and into registry with said aperture, a cantilever spring member connected at one end to said plate adjacent said aperture, said magazine being formed with an exit through which the slides are moved by said changer, and a slide-separating spring carried by the free end of said cantilever member and extending across said exit and in the path of the slides moved therethrough, the movement of thin slides through said exit serving to flex said separating spring relative to said member to permit the passage of the thin slide, but the passage of a thick slide serves both to flex said spring and also to move the latter and said member relative to said plate to allow said thick slide to pass through said exit, said spring after being flexed by a slide finally springs back to engage the next slide in the magazine to prevent the simultaneous feeding of two adjacent slides at one time.

8. A slide-changing apparatus, comprising, in combination, a plate formed with a projection aperture in which a slide is positioned during projection, a supply magazine connected to said plate adjacent an end thereof and adapted to receive a plurality of slides which may vary in thickness, a slide changer slidably mounted on said plate and movable across the front end of said magazine to move a slide out of said magazine and into registry with said aperture, a cantilever spring member connected at one end to said plate adjacent said aperture, said magazine being formed with an exit through which the slides are moved by said changer, a slide-separating spring carried by the free end of said cantilever member and extending across said exit and in the path of the slides moved therethrough, the movement of thin slides through said exit serving to bring an edge of the slide into engagement with and to impart a slight flexing of said spring but the passage of thick slides causing the edge of the latter to impart an increased flexing of the spring to move the latter and the member about said one end to allow the passage of the thicker slide, said slides serving to flex said spring to a point at which the spring snaps back and wipes along the surface of the slide being moved and into engagement with the foremost slide in the magazine to prevent the simultaneous feeding of the latter so that only one slide will be moved at a time, and a pressure pad carried by said member for holding a slide in position in said aperture.

9. A slide-changing apparatus, comprising, in combination, a plate formed with a projection aperture in which a slide is positioned during projection, a supply mazagine connected to said plate adjacent an end thereof and adapted to receive a plurality of slides which may vary in thickness, a slide changer slidably mounted on said plate and movable across the front end of said magazine to move a slide out of said magazine and into registry with said aperture, a cantilever spring member connected at one end to said plate adjacent said aperture, said magazine being formed with an exit through which the slides are moved by said changer, a slide-separating spring carried by the free end of said cantilever member and extending across said exit and in the path of the slides moved therethrough, the movement of thin slides through said exit serving to flex said separating spring relative to said member to permit the passage of the thin slide, but the passage of thicker slides causing an increased flexing of said separating spring, and means on said separating spring for moving said spring member about said one end when said flexing is increased, said slides flexing said separating spring to a point at which the latter spring snaps back into engagement with the next slide in the magazine to hold the latter against movement to prevent the feeding of more than one slide at a time.

10. A slide-changing apparatus, comprising, in combination, a plate formed with a projection aperture in which a slide is positioned during projection, a supply magazine connected to said plate adjacent an end thereof and adapted to receive a plurality of slides which may vary in thickness, a slide changer slidably mounted on said plate and movable across the front end of said magazine to move a slide out of said magazine and into registry with said aperture, a cantilever spring member connected at one end to said plate adjacent said aperture, said magazine being formed with an exit through which the slides are moved by said changer, a slide-separating spring carried by the free end of said cantilever member and extending across said exit and in the path of the slides moved therethrough, the movement of thin slides through said exit serving to flex said separating spring relative to said member to permit the passage of the thin slide, but the passage of thicker slides causing an increased flexing of said separating spring, lugs formed from said cantilever spring member adjacent said separating spring, and means on said separating spring for engaging said lugs when said separating spring is flexed an increased amount by said thicker slides for moving said cantilever spring and separating spring as a unit about said one end, the slides being moved by said changer serve to flex said separating spring to a point at which the separating spring snaps away from the slide being moved and into the path of the foremost slide in the magazine to prevent movement of the latter so as to prevent the feeding of more than one slide at a time.

11. A slide-changing apparatus, comprising, in combination, a plate formed with a projection aperture in which a slide is positioned during projection, a supply magazine connected to said plate adjacent an end thereof and adapted to receive a plurality of slides which may vary in thickness, a slide changer slidably mounted on said plate and movable across the front end of said magazine to move a slide out of said magazine and into registry with said aperture, a cantilever spring member connected at one end to said plate adjacent said aperture, said magazine being formed with an exit through which the slides are moved by said changer, an L-shaped slide-separating spring secured to the free end of said cantilever member and formed with a free portion which lies in alignment with a side of said magazine and across said exit and in the path of the slides as they are moved out of said magazine, the movement of thin slides from said magazine causes said thin slides to engage and flex said portion to permit the slide to pass thereover, a lip formed on the end of said portion, and lugs on said cantilever member positioned adjacent said lip, the movement of thicker slides through said exit causing said thicker slides to impart an increased flexing of said portion to move said lip into engagement with said lugs to shift said cantilever member and said separating spring as a unit about said one end to allow said thicker slides to pass over said portion, the slides being moved by said changer serve to flex said separating spring to a point at which the separating spring snaps away from the slide being moved and into the path of the foremost slide in the magazine to prevent movement of the latter so as to prevent the feeding of more than one slide at a time.

12. A slide-changing apparatus, comprising, in combination, a plate formed with a projection aperture in which a slide is positioned during projection, a supply magazine connected to said plate adjacent an end thereof, and adapted to receive a plurality of slides which may vary in thickness, a slide changer slidably mounted on said plate and movable across the front end of said magazine to move a slide out of said magazine and into registry with said aperture, a cantilever spring member connected at one end to said plate adjacent said aperture, said magazine being formed with an exit through which the slides are moved by said changer, an L-shaped slide-separating spring secured to the free end of said cantilever member and formed with a free portion which lies in alignment with a side of said magazine and across said exit and in the path of the slides as they are moved out of said magazine, the movement of thin slides from said magazine causes said thin slides to engage and flex said portion sufficient to permit the thin slides to pass thereover, a lip formed on the end of said portion, and lugs on said cantilever member positioned adjacent said lip, the movement of thicker slides through said exit causing said thicker slides to impart an increased flexing of said portion to move said lip into engagement with said lugs to shift said cantilever member and said separating spring as a unit about said one end to allow said thicker slides to pass over said portion, the slides being moved by said changer serve to flex said separating spring to a point at which the separating spring snaps away from the slide being moved and into the path of the foremost slide in the magazine to prevent movement of the latter so as to prevent the feeding of more than one slide at a time, and a yieldable pressure pad carried by said cantilever member for retaining said slides in position at said aperture.

ARTHUR B. SIMMONS.

REFERENCES CITED

The following references are of record in the file of this patent:

UNITED STATES PATENTS

| Number | Name | Date |
|---|---|---|
| 424,857 | Chouteau | Apr. 1, 1890 |
| 477,337 | Sault | June 21, 1892 |
| 595,165 | Green et al. | Dec. 7, 1897 |
| 599,556 | Flora | Feb. 22, 1898 |
| 684,630 | Core et al. | Oct. 15, 1901 |
| 984,055 | White | Feb. 14, 1911 |
| 1,002,078 | Paoli | Aug. 29, 1911 |
| 1,018,439 | Newman | Feb. 27, 1912 |
| 1,159,681 | Kastner | Nov. 9, 1915 |
| 1,729,304 | Wagner | Sept. 24, 1929 |
| 2,260,660 | Darwin | Oct. 28, 1941 |
| 2,310,047 | Waldeyer | Feb. 2, 1943 |
| 2,364,788 | Harvey et al. | Dec. 12, 1944 |